United States Patent Office 3,480,648
Patented Nov. 25, 1969

3,480,648
ORGANIC PEROXIDES OBTAINED BY REACTION OF HYDROPEROXIDES WITH HYDROXY-ACETONE AND PROCESS
Yun G. Chang, Austin, Tex., assignor to Reichhold Chemicals, Inc., White Plaines, N.Y.
No Drawing. Filed Jan. 19, 1968, Ser. No. 699,064
Int. Cl. C07d *15/10;* C08f *1/60*
U.S. Cl. 260—340.6
11 Claims

ABSTRACT OF THE DISCLOSURE

This invention discloses a novel class of peroxides having the following formula:

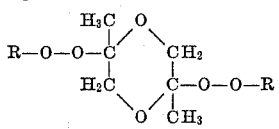

wherein R is a hydrogen atom, an alkyl group, an aralkyl group, an acyl or aracyl group and the method of preparing same by reacting hydroxy-acetone with hydroperoxide at a temperature of 0° C. to 80° C. in the presence of an acidic catalyst.

---

The invention relates to peroxides having the following formula:

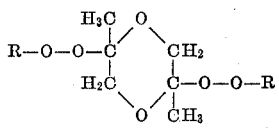

wherein R is a hydrogen atom, an alkyl group, an aralkyl group, an acyl or aracyl group and the method of preparing same by reacting hydroxy-acetone with hydroperoxides at a temperature of 0° C. to 80° C. in the presence of an acidic cataylst.

It is an object of this invention to provide a novel class of peroxides which are highly efficient polymerization initiators.

It is another object of this invention to provide highly efficient methods for the preparation of such polymerization initiators.

It is still another object of this invention to produce these peroxides from hydroxy-acetone.

These and other objects and advantages of the present invention will become more apparent from the detailed description thereof set forth hereinbelow.

It has now been found that these objectives can be attained by reacting hydroxy-acetone with hydroperoxides in the presence of an acidic catalyst. This reaction takes place at a temperature ranging from about 0° C. to 80° C. The preferred temperature however is between about 0° C. and 10° C., on account of the outstanding results obtained therefrom.

In the reaction of this invention, the mol ratio of hydroxy-acetone to hydroperoxide may vary widely, from 10:1 to 1:10. However, the preferable mol ratio of hydroxyacetone to hydroperoxide is in the range of 2:1 to 1:1. It has been found that the use of a large excess of hydroperoxide for the reaction causes more side reactions, and consequently, the formation of more by-products.

The hydroperoxide used in this invention is represented by the formula:

R—O—O—H wherein R can be either a hydrogen, an alkyl group, an aralkyl group, an acyl group or an aracyl group. The preferred hydroperoxides would be the hydroperoxides, which contain tertiary alkyl or tertiary aralkyl groups, because outstanding results are achieved therefrom.

The catalysts may include sulfuric acid, hydrochloric acid, perchloric acid and phosphoric acid. The preferred catalyst is sulfuric acid used as a 70% solution, because outstanding results are achieved therefrom. The amount of these catalysts may vary from a trace to 40%, based on the weight of the reaction mixture described below. However, an amount of 10–15%, based on the weight of said reaction mixture is preferred on account of superior results achieved therefrom.

In order to understand the mechanism of the reaction the following equation is exemplified:

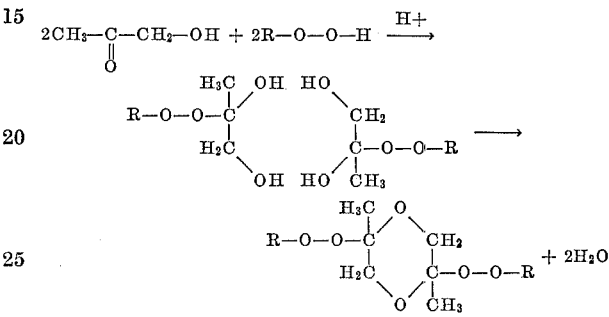

wherein R is a hydrogen atom, an alkyl group, an aralkyl group, an acyl group or an aracyl group.

This novel class of organic peroxides has been found to provide good catalysts or initiators in polymerization reactions, such as the polymerization of styrene, vinyl acetate, alkyl methacrylates, and the like. They have also been found to be useful as cross-linking agents.

EXAMPLE I

Preparation of 2,5-di-t-butylperoxy-2,5-dimethyl-1,4-dioxane

Two hundred and thirty-four grams (3.0 moles) of 95% hydroxy acetone was mixed with 70.0 g. (0.5 mole) of 70% sulfuric acid in a beaker, at room temperature, with stirring. To the resulting mixture was slowly added 300.0 g. (3.0 moles) of 90% t-butyl hydroperoxide, at 0° C., with powerful agitation. The reaction mixture was stirred at from 0° C. to 10° C. for an hour. The colorless crystalline solid product was filtered off and washed four times with water in the funnel. Then, it was sucked to dryness. The crude product weighed 353.0 g., indicating a 40.5% yield based upon the hydroxy-acetone used for the reaction. It melted at 66° C. and contained 12.61% active oxygen determined by hydriodic acid-sodium thiosulfate titration and 7.14% active oxygen shown by the potassium iodide-sodium thiosulfate titration.

The product was purified by five crystallizations from dilute ethyl alcohol. The pure material melted at 92° C. and contained 11.15% and 2.48% active oxygen determined by the treatment with hydriodic acid solution and by the treatment with potassium iodide solution, respectively, compared with the theoretic active oxygen content 10.96%.

*Analysis.*—Calcd. for $C_{14}H_{28}O_6$: C, 57.51; H, 9.65; O, 32.84. Molecular weight 292.4. Found: C, 57.33; H, 9.74; O, 32.98. Molecular weight 297.

The infrared spectrum of this compound showed a strong band at 2950 cm.$^{-1}$ due to $CH_2$ and $CH_3$ groups, a strong band at 1365 cm.$^{-1}$, due to a C $(CH_3)_3$ group, very strong bands at 1190 cm.$^{-1}$, 1140 cm.$^{-1}$, and 1085 cm.$^{-1}$, indicating the structure of p-dioxane, and a very strong band at 865–870 cm.$^{-1}$ representing peroxide groups.

On the basis of these data, the structural formula of this new peroxide is assigned as below.

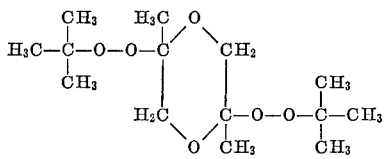

EXAMPLE II

Preparation of 2,5-di-t-amylperoxy-2,5-dimethyl-1,4-dioxane

To a mixture of 7.8 g. (0.1 mole) of 95% hydroxy-acetone and 2.4 g. (0.017 mole) of 70% sulfuric acid, in a beaker, was slowly added 10.4 g. (0.1 mole) of t-amyl hydroperoxide, at 0° C., with powerful agitation. The reaction mixture was stirred at 0–10° C. for an hour. A colorless crystalline solid product was obtained in about 40% yield based on the amount of hydroxy-acetone used for the reaction. This compound was the peroxide 2,5-di-t-amylperoxy - 2,5 - dimethyl - 1,4 - dioxane, as shown by the determination of its active oxygen content.

EXAMPLE III

Preparation of 2,5-dicumylperoxy-2,5-dimethyl-1,4-dioxane

To a mixture of 7.8 g. (0.1 mole) of 95% hydroxy-acetone and 2.4 g. (0.017 mole) of 70% sulfuric acid, in a beaker was slowly added 15.2 g. (0.1 mole) of cumyl hydroperoxide at 0° C., with powerful agitation. The reaction mixture was stirred at 0–10° C. for an hour. A colorless crystalline solid product was obtained in about 40% yield based upon the quantity of hydroxy-acetone used for the reaction. As indicated by the active oxygen content, this new peroxide was 2,5-dicumylperoxy - 2,5-dimethyl-1,4-dioxane.

What is claimed is:

1. A process of preparing an organic peroxide comprising reacting (1) hydroxy-acetone at a temperature of from about 0° C. to about 80° C. in the presence of an acidic catalyst selected from a group consisting of sulfuric acid, hydrochloric acid, perchloric acid and phosphoric acid, with (2) a hydroperoxide having the formula

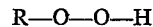

wherein R is a member of the group consisting of butyl, amyl and cumyl, said hydroxy-acetone and said hydroperoxide reacting at mole ratios of from about 10:1 to about 1:10.

2. A process according to claim 1 wherein the temperature of the reaction is between about 0° and about 10° C.
3. A process according to claim 1 wherein the amount of the acidic catalyst used ranges from about 10% to about 15% based on the weight of the reaction mixture.
4. A process according to claim 1 wherein the acidic catalyst used is sulfuric acid having a strength of about 70%.
5. A process according to claim 1 wherein the hydroperoxide is tertiary butyl hydroperoxide.
6. A process according to claim 1 wherein the hydroperoxide is tertiary amyl hydroperoxide.
7. A process according to claim 1 wherein the hydroperoxide is cumyl hydroperoxide.
8. An organic peroxide having the formula:

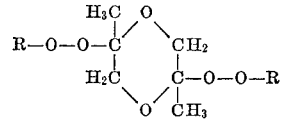

wherein R is a member of the group consisting of butyl, amyl and cumyl.

9. 2,5-di-t-butylperoxy-2,5-dimethyl-1,4-dioxane.
10. 2,5,di-t-amylperoxy-2,5-dimethyl-1,4-dioxane.
11. 2,5-dicumylperoxy-2,5-dimethyl-1,4-dioxane.

References Cited

UNITED STATES PATENTS 3,149,126  9/1964  Milas _____ 260—340.6 X

ALEX MAZEL, Primary Examiner

JAMES H. TURNIPSEED, Assistant Examiner